April 20, 1965

A. H. CRYSTAL ETAL 3,179,947

DEVICE FOR MAKING A PERMANENT RECORD OF THE
NATURE AND OCCURRENCE OF AN EVENT
Filed Nov. 20, 1961

INVENTORS
ALFRED H. CRYSTAL
MARTIN HERBSTMAN
BY HERBERT S. KAHN

Moses, Nolte & Nolte
ATTORNEYS

United States Patent Office 3,179,947
Patented Apr. 20, 1965

3,179,947
DEVICE FOR MAKING A PERMANENT RECORD OF THE NATURE AND OCCURRENCE OF AN EVENT
Alfred H. Crystal, Howard Beach, and Martin Herbstman, Flushing, N.Y., and Herbert S. Kahn, West Orange, N.J., assignors to Maxson Electronics Corporation, New York, N.Y., a corporation of New York
Filed Nov. 20, 1961, Ser. No. 153,547
11 Claims. (Cl. 346—77)

This invention relates to means for producing a record of the nature and occurrence of a specific event. In addition, the recorder includes means for producing an indication of the time at which the particular event occurred. More patricularly, this invention provides a rugged, compact, simple, fastacting and relatively inexpensive means for making a permanent record showing whether or not a particular event occurred. One application would be to show which of several occurrences caused the failure of an airplane. Another would be to record the time when each of several events occurred within a limited period, such as occurs during a missile test flight.

Thus, the primary object of this invention is to provide means for producing a permanent record of the occurrence of an event.

It is another object of the invention to provide a simple, compact event recorder which would be salvagable in the event of a plane crash.

Another object of the invention is to provide an event recorder which will indicate the nature of an event and time of occurrence of the event.

Still another object is to provide an event recorder which will produce a permanent record of events which may occur sequentially or simultaneously.

The objects of the invention are accomplished by the use of a plurality of small capacitors having an extremely high resistance, but adapted to break down at a predetermined voltage to an extremely low resistance. Means are provided, responsive to an event, for applying a voltage across certain ones of these capacitors (depending upon the event) in excess of the breakdown voltage. In this manner, the nature of the event may be determined by which of the capacitors has been broken down. In addition, the capacitors may be arranged in a matrix, wherein a distributor selectively energizes certain coordinates of the matrix on a time basis. With this arrangement, it is also possible to determine the time when the event occurred.

The manner in which the above objects are accomplished will be explained in more detail with reference to the following specification and drawings, wherein.

According to the illustrated embodiment of the invention, the actual recording element comprises a small capacitor which initially has an extremely high resistance. The capacitor is so constructed that when a specified voltage (approximately fifteen volts) is applied across it, the capacitor breaks down to a permanently low resistance. Such capacitors are presently available with a capacitance of about five hundred micro microfarads, and can be packed seventy-five to one hundred per cubic inch. Their breakdown time is approximately one micro second or less. It is to be understod that although capacitors are disclosed in this embodiment, any other impedance means capable of displaying a permanent radical change in impedance may be equally well employed within the spirit of the invention.

Figure 1A:
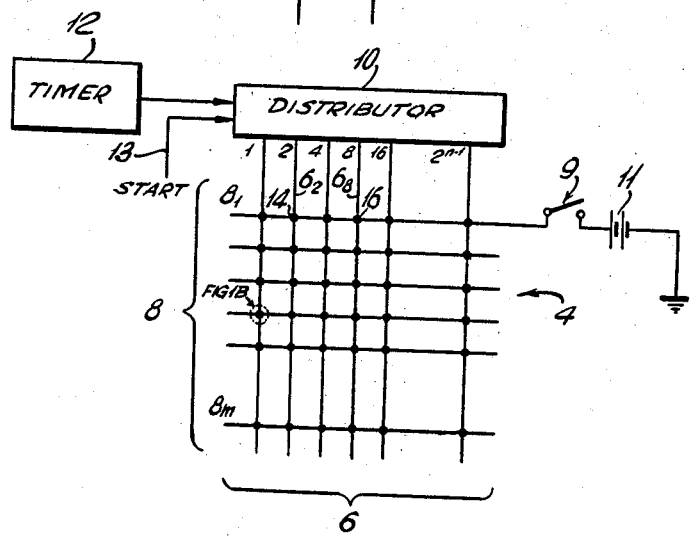
FIG. 1A illustrates a block diagram of the invention.

Referring now to FIG. 1A, a matrix of these capacitors is indicated generally at 4. Matrix 4 comprises vertical conductors 6 arranged in $n$ columns, and horizontal conductors 8 arranged in $m$ rows. An impedance branch is arranged between respective conductors 6 and 8 at all of the intersections thereof.

The horizontal conductors 8 are responsive to the event to be recorded. For instance, if the recorder were to be used in an airplane, each engine could have a unit for sensing the failure of the fuel supply, a unit for sensing failure of the ignition, etc. Upon the occurrence of the event to be recorded, a voltage is applied in any well known manner to one of the horizontal rows 8 depending upon the event. For example, one possible circuit is shown in conjunction with conductor $8_1$. Switch 9, which may be relay operated, is closed upon the occurrence of a specific event, and connects a source of potential 11 to conductor $8_1$. This potential can be a battery and switch, as shown, or any other suitable source such as a pulse. The remaining conductors $8_2$–$8_m$ may all have similar energizing circuits responsive to any other desired events. Thus, each of the $m$ rows is associated with a separate event, and when the event occurs, a voltage is applied to the conductor in that specific row.

The voltage of one of conductors 8, due to the occurrence of an event, is insufficient by itself to break down the capacitors until the circuit is completed by the connection of ground (for example) to the other side of the capacitor. If it is desired to record only that an event has occurred without indicating the time of occurrence the ground can be connected permanently. If, however, it is desired to show when the event occurred during a limited time interval a distributor 10 sequentially applies a ground voltage to various ones of the vertical conductors 6 to produce a sufficient voltage drop between these conductors 6 and the selector row of conductors 8 to break down the capacitors between the selected conductors. The distributor in this embodiment is a binary counter which is driven by a timer 12. The distributor is responsive to the input timing pulses in a well known manner, and if it is an $n$ stage counter, is capable of counting $2^n-1$ timing pulses before recycling. In its "one" state, each stage of distributor 10 supplies a ground voltage to its output terminal. A "start" signal applied to line 13 permits the distributor to start counting in a conventional manner, and also affords a reference from which point the time scale may be determined. The output from the binary counter is taken in parallel, so that depending upon the number of pulses received from timer 12, one or more counter stages applies a ground voltage to the corresponding vertical conductors 6. The counter maintains each state until the following timing pulse arrives, so that at all times at least one of conductors 6 has a ground voltage applied thereto.

If, for example, we assume that the frequency of timer 12 is ten cycles per second, then a one second interval would be represented by ten pulses from the timer. The distributor 10, after the reception of ten pulses, would apply a ground signal to colums $6_2$ and $6_3$, so that if during this time interval a fault occurred in any circuit connected to one of the conductors 8 (for example, conductor $8_1$), the capacitors at intersections 14 and 16 would be permanently broken down to their low resistance value.

After the permanent record has been made, the matrix may be examined to determine which of the capacitors has been broken down. The row in which the breakdown occurs will indicate the nature of the event, while the position of the broken down capacitors in that row will indicate the relative time at which the event occurred. Read-out, of course, would simply involve testing the impedance of the various impedance branches in any well known manner.

Although the breakdown of the capacitor is very rapid, it is not to be expected that it will be absolutely uniform in all of the capacitors in any row of conductors 8. Moreover, if the resistance of one capacitor was reduced prior to the reduction of the others, there would be no voltage available to break down the remaining capacitors in that row. In such a case, an accurate indication of the time of occurrence would not be achieved. To avoid this situation, a small resistor is placed in series with each of the capacitors between the respective conductors of the matrix to produce a voltage drop which permits the breakdown of the remaining capacitors in the row.

Figure 1B:
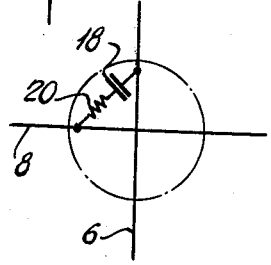
FIG. 1B illustrates an impedance element of particular utility with the invention.

In FIG. 1B there is illustrated the impedance branches connected at each of the intersections of the matrix. As shown, a capacitor 18 is connected in series with a resistor 20 at the intersection of conductors 6 and 8. Although only one impedance branch is illustrated, it is to be understood that a similar branch is connected between conductors 6 and 8 at every intersection thereof. The addition of resistor 20 to the impedance branch does not affect the read-out procedure, since it is a relatively simple matter to distinguish between the several megohms of the undamaged capacitor and the few thousand ohms in series with those which have been broken down.

Figure 2:
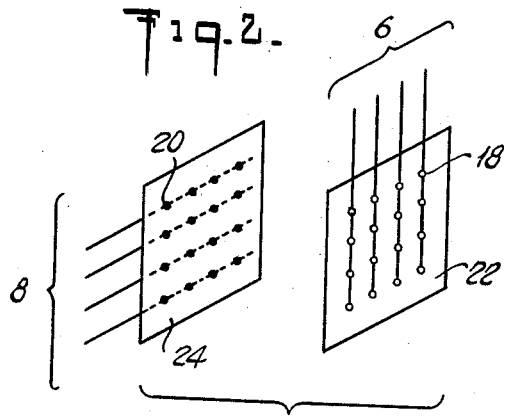
FIG. 2 illustrates one form of the mechanical structure of the recording matrix illustrated in FIGS. 1A and 1B.

In FIG. 2, the physical construction of the matrix embodied in FIG. 1A is illustrated. The matrix comprises two plates 22 and 24. The conductors 6 are attached to the external surface of plate 22 and are connected to one end of the capacitors, the other ends of which extend through the plate and appear on the interior surface of the plate. The horizontal conductors 8 are fixed to the external surface of plate 24 and are connected to one end of the resistors 20 as shown. As in the case of the capacitors, the other ends of the resistors are located on the interior surface of the plate. The capacitors and resistors are physically designed so that the two will mate with each other when the interior surfaces of the two plates are joined. The structure of FIG. 2 can additionally simplify the readout procedure, since the capacitors may be separated from the resistors, and the testing performed without the additional series resistance.

If it is possible to obtain capacitors with a built-in resistor, then it is only necessary to utilize a single plate, having the conductors on opposite sides thereof.

Although the invention has been disclosed as embodying capacitor impedance branches, it is to be understood that other devices such as fuses, bridge wires, squibs, etc., could be equally well employed within the scope of the invention, and it is not my intention to be limited except as defined in the following claims.

We claim:

1. An event recorder comprising a first set of conductors arranged in rows, a second set of conductors arranged in columns, said second conductors intersecting said first conductors to form a matrix, impedance branches connecting said first conductors to said second conductors at the intersections thereof, said impedance branches having two distinct states and adapted to permanently assume one of said states in response to a voltage above a predetermined magnitude, means responsive to the occurrence of an event for selectively applying a voltage to one of said first conductors depending upon the nature of the event, and time responsive distributor means for applying a voltage to at least one of said second conductors, the simultaneous application of said voltages to any of said impedance branches causing said branch to permanently change its state, the row in which the altered impedance branches are located indicating the nature of the event, and the location of the altered impedances in that row indicating the time of occurrence of the event.

2. An event recorder according to claim 1, wherein said impedance branches comprise a normally high-resistance capacitor which breaks down to a low-resistance state in response to said predetermined voltage.

3. An event recorder according to claim 2, wherein resistance means are connected in series with said capacitors.

4. An event recorder according to claim 3, including two plates, one set of conductors and said resistors situated in one plate, the other set of conductors and said capacitors situated in the other plate.

5. An event recorder according to claim 4, wherein said resistors and capacitors include means for securing said plates together to form a complete matrix.

6. An event recorder according to claim 1, wherein said impedance branches are fixed to a plate.

7. An event recorder according to claim 1, wherein said distributor means comprises a binary counter, the output of separate stages of said counter being connected to separate columns of said matrix, whereby when an event occurs the time of occurrence may be determined by which of said impedances has been permanently altered.

8. An event recorder according to claim 7, wherein said impedance branches are fixed to plate means.

9. An event recorder comprising capacitor means, said capacitor means being adapted to breakdown in response to a voltage exceeding a predetermined level, means responsive to the event to be recorded for selectively applying a voltage to said capacitor means depending upon the nature of the event occurring, and means for applying a second voltage to said capacitor means, the simultaneous application of said voltages exceeding said predetermined level, whereby a permanent record may be had indicative of the occurrence and nature of an event.

10. An event recorder according to claim 9, wherein a resistor is connected in series with said capacitor.

11. An event recorder according to claim 7, wherein said impedance branches comprise a normally high resistance capacitor which breaks down to a low resistance in response to said predetermined voltage.

References Cited by the Examiner

UNITED STATES PATENTS

| | | | |
|---|---|---|---|
| 2,610,102 | 9/52 | Gitzendanner et al. | 346—34 |
| 2,817,815 | 12/57 | Evans | 324—77 |
| 2,928,075 | 3/60 | Anderson | 340—173 |
| 3,011,156 | 11/61 | MacPherson | 340—173 |
| 3,043,988 | 7/62 | Hurvitz | 315—169 |
| 3,048,824 | 8/62 | Thompson | 340—173 |
| 3,077,591 | 2/63 | Akmenkalns | 34—77 |
| 3,091,754 | 5/63 | Nazare | 340—173 |
| 3,091,876 | 6/63 | Cole | 315—169 |
| 3,098,996 | 7/63 | Kretzmer | 340—173 |

LEO SMILOW, *Primary Examiner.*

EMIL G. ANDERSON, *Examiner.*